United States Patent
Bennett et al.

(10) Patent No.: US 9,573,607 B2
(45) Date of Patent: Feb. 21, 2017

(54) SYSTEM FOR ACCURATE MEASUREMENT OF VEHICLE SPEEDS FOR LOW SPEED INDUSTRIAL APPLICATIONS

(71) Applicant: Kanawha Scales & System, Inc., Poca, WV (US)

(72) Inventors: Duane Lee Bennett, Buffalo, WV (US); Robert Emil Barker, Jr., Ronceverte, WV (US); James Troy Foley, Cross Lanes, WV (US)

(73) Assignee: Kanawha Scales & Systems, Inc., Poca, WV (US)

( * ) Notice: Subject to any disclaimer, the term of this patent is extended or adjusted under 35 U.S.C. 154(b) by 498 days.

(21) Appl. No.: 14/204,421

(22) Filed: Mar. 11, 2014

(65) Prior Publication Data

US 2014/0313503 A1    Oct. 23, 2014

Related U.S. Application Data

(60) Provisional application No. 61/787,974, filed on Mar. 15, 2013.

(51) Int. Cl.

| | |
|---|---|
| *B61L 27/00* | (2006.01) |
| *G01P 5/18* | (2006.01) |
| *G01S 17/58* | (2006.01) |
| *G01S 17/42* | (2006.01) |
| *G01S 17/88* | (2006.01) |
| *G01S 7/48* | (2006.01) |
| *G01S 7/497* | (2006.01) |

(52) U.S. Cl.
CPC .............. *B61L 27/0077* (2013.01); *G01P 5/18* (2013.01); *G01S 7/4808* (2013.01); *G01S 7/497* (2013.01); *G01S 17/42* (2013.01); *G01S 17/58* (2013.01); *G01S 17/88* (2013.01)

(58) Field of Classification Search
CPC ......... B65G 67/22; B65G 69/20; B65G 69/02; B65G 69/00; B30B 3/00
See application file for complete search history.

(56) References Cited

U.S. PATENT DOCUMENTS

| | | | |
|---|---|---|---|
| 3,779,086 A | 12/1973 | Myrent et al. | |
| 4,020,490 A | 4/1977 | Millard | |
| 5,615,677 A * | 4/1997 | Pelc ........................ | G01R 33/56 324/306 |
| 5,642,299 A * | 6/1997 | Hardin ..................... | G01C 3/10 340/937 |
| 5,949,530 A | 9/1999 | Wetteborn | |
| 7,041,962 B2 | 5/2006 | Dollmann et al. | |
| 7,589,826 B2 | 9/2009 | Mack et al. | |
| 7,610,152 B2 | 10/2009 | Meyer | |
| 7,757,946 B2 | 7/2010 | Kienzle-Lietl | |

(Continued)

OTHER PUBLICATIONS

Advantech, UNO—2174G/GL, UNO—21746/GL, Intel Celeron Automation Computers with 4×GbE, 2×Mini PCIe, DVI/DP/HDMI, UNO-21846, Intel Core i7 Automation Computer with 4×GbE, 2×Mini PCIe.

(Continued)

*Primary Examiner* — Luke Ratcliffe

(74) *Attorney, Agent, or Firm* — Cahn & Samuels, LLP

(57) ABSTRACT

A continuous scanning side laser detector system and method for real time, instantaneous accurate speed and direction measurement of a slow moving bulk material transport vehicle through a bulk material processing station.

20 Claims, 5 Drawing Sheets

(56) References Cited

U.S. PATENT DOCUMENTS

| | | |
|---|---|---|
| 8,045,962 B2 | 10/2011 | Schullian et al. |
| 8,379,927 B2 | 2/2013 | Taylor |
| 8,380,361 B2 | 2/2013 | Evans |
| 2010/0109903 A1 | 5/2010 | Carrick |
| 2010/0176921 A1 | 7/2010 | Frederick |
| 2010/0251924 A1* | 10/2010 | Taylor ............... B61D 7/30 105/286 |
| 2011/0126723 A1* | 6/2011 | Nyquist ............. B65G 67/22 100/43 |
| 2011/0226909 A1 | 9/2011 | O'Dell et al. |
| 2011/0255070 A1* | 10/2011 | Phillips .............. G01S 7/4813 356/4.01 |

OTHER PUBLICATIONS

Sick AG, Bulkscan LMS511, Non-Contact and Maintenance-Free Sensor for Measuring Volume Flow.
Sick AG, Operating Instructions, Laser Measurement Sensors of the LMS5xx Product Family, dated Apr. 18, 2012.
IDEC Corporation, PS5R-S, Switching Power Supplies, dated Jul. 9, 2013.
SICK AG, Product Information, LMS5xx Laser Measurement Technology, Sep. 2, 2011.
Applied Concepts, Inc., Stalker Radar, Lidar RR, Precise Laser Speed & Distance Measurement Designed Especially for Railroad Use, 2011.
International Application PCT/US2014/027594, International Search Report, dated Jul. 30, 2014.
International Application PCT/US2014/027594, Written Opinion, dated Jul. 30, 2014.

\* cited by examiner

SYSTEM FOR ACCURATE MEASUREMENT OF VEHICLE SPEEDS FOR LOW SPEED INDUSTRIAL APPLICATIONS

PRIORITY CLAIM

This application claims the benefit of U.S. Provisional Application Ser. No. 61/787,974 filed on Mar. 15, 2013 which is incorporated herein by reference.

FIELD OF INVENTION

This invention relates to the precise and responsive measurement of slow speed bulk material transport vehicles when associated with bulk material processing stations and, more particularly, with precise measurement of the speed of a specific individual railcar in a train moving in a straight line.

BACKGROUND

The measurement of speed of an individual railcar in a moving train proximate to a bulk material processing station is not addressed by existing systems. Bulk material processing, including loading, unloading, and/or cargo spray treatments, etc., involving a moving railcar requires extreme precision to avoid inefficiencies, errors and/or wastage. Where the control center/station is electronically connected to an associated bulk material processing device adapted for kinetic as opposed to static operations, loading/unloading/coating application, etc., waste and inefficiencies result from assuming vehicle speed. For example, when the speed of a railcar is estimated or assumed, it may be overloaded resulting in spillage if it passes too slowly through a loading facility. Correspondingly, when the estimated speed is too slow of a filled hopper railcar passing through a special application station, e.g., spraying a latex surfactant dust suppressant or anti-freeze/freeze-proofing material on a railcar/content, the spraying will be incomplete as the terminal portion of the bulk material vehicle/load will not be coated. Such incomplete applications may result in unnecessary labor to remove frozen material and/or even lead to violations of applicable transportation regulations. Conversely, if the assumed speed varies in the context of loading, a vehicle may be overloaded, under loaded, or unevenly distributed. In the context of applying additives, additives may be wasted or placed imprecisely (economically and environmentally undesirable). The invention maximizes efficiencies of such operations by determination of the specific target railcar speed rather than generalizing across the entire train.

The prior art contains numerous examples of speed and directional sensing systems based on discrete sensors, such as photo-eyes or rail track switches, However, such systems due to sensor spacing, can only update such information periodically. While this method of measuring speed is somewhat reasonable for overall or general speed determination, such systems are inadequate to make real-time speed determinations during critical stages. More specifically, reliance on sets of static discrete sensors (usually photoelectric sensors or track mounted switches) installed at known distances from each other may not be accurate when a railcar stops or is subject to speed irregularities between two sensors. Even reliance on sophisticated computers, e.g., a PLC (Programmable Logic Controller) control system that monitor the on/off state of the static sensors and calculate the time elapsed between subsequent sensor on/off states to process the periodic data does not overcome the real-time detection issue.

Such a situation can be problematic particularly in cases such as when the measured speed information is provided to a flow control device or a loading chute in a bulk material processing station. One technique employed to overcome this negative consequence is to populate the system with more detectors. By adding additional static sensors to the sensor array, the 'resolution' of the system is increased and the speed determination errors correspondingly minimized. But such a "solution" introduces additional infrastructure needs in wiring, sensors, PLC control points, etc. such that the system becomes expensive, difficult to operate, and requires considerably labor to maintain. Furthermore, although to a lesser extent, such a periodic sensing array still possesses similar limitations to those described above.

Another approach to measure train speed is based on Doppler shift-technology (e.g., police radar). However, at sub-5 miles per hour speeds typically associated with bulk material processing operations, Doppler shift detection is neither meaningfully measurable nor capable of providing the required accuracy for vehicle speed detection. This is attributable to the virtually non-existent Doppler shift at low speeds at typical approved frequencies. Consequently, in the context of bulk material transport and processing equipment (loaders, unloaders, sprayers, etc.), particularly in the case of a slow moving train of coupled railcars, such conventional speed measuring devices are ineffective and not reliably usable for vehicle/bulk material processing equipment coordination.

Other conventional approaches utilized for determining the speed of railcars in a moving unit train include satellite GPS tracking and on-board, stationary electro-mechanical devices. An example of a locomotive-mounted, onboard electromechanical, device is described in U.S. Pat. No. 3,779,086 (a locomotive drive-truck-mounted pulse generator speed and distance measurement device). An example of a more modem GPS based system is described in U.S. Pat. No. 7,610,152 (a train-mounted navigator geo-positional receiver solution combined with track database information). Neither of these prior art systems are capable of determining the specific velocity of an individual railcar within a long train where such velocity can vary at any discrete point in time due to train stretching (tension) or bunching (compression) effects caused, for example, by coupler slack considerations. Therefore, locomotive or whole train based speed determination whether from a vehicle mounted device or remote tracking device, e.g., GPS, are not sufficiently applicable or accurate for usage during critical stages of bulk material processing operations.

The final prior art approach for railcar speed measurement described herein is based on laser detection (LIDAR). The Stalker Laser from Applied Technologies, Inc. is reported to provide laser speed measurement at a range up to 4000 feet with reported 0.2 mph sensitivity. While representing an improvement, this system does not address the specific problem associated precise speed measurement of an individual rail-car in a moving train associated with a bulk material processing station.

Thus there exists a need for a system and method to achieve precise and accurate, instantaneous, real time individual bulk material transport vehicle, and particularly, a railcar, speed measurement proximate to a bulk material processing station.

SUMMARY OF THE INVENTION

It is an object of the present invention to overcome and solve the shortcomings of the prior art in connection with speed measurement of a specific vehicle for bulk material transport associated with a bulk material processing facility.

Another object of the invention is to provide a computationally efficient method to achieve precise and responsive speed measurement of individual, low speed, material transport vehicles moving in relation to bulk material processing operations (loading and unloading, coating applications, etc.).

It is another object of the invention to provide a system adapted for mounting a laser/receiving sensor unit essentially perpendicular to the line of vehicle travel to precisely measure speed of a slow moving target vehicle.

It is another object of the invention to precisely measure speed in real-time of an individual railcar in a long train using triangulation in lieu of conventional periodic based detection.

A further object of the invention is to flatten detected signals to generate create a dataset, compare that dataset to a previously obtained dataset for deviations and select the dataset for speed determination if within an acceptable margin.

Still a further object of the invention is to employ an algorithm on obtained speed measurements to create a rolling average speed profile for an individual vehicle in a train.

Certain of these and other objects are satisfied by a system for instantaneous, real-time speed measurement of a select low speed transport vehicle moving in a linear direction of travel and proximate to a bulk material processing station, comprising: a stationary scanning laser and detecting sensor positioned to one side of and generally perpendicular to the direction of travel, said scanning laser and detecting sensor capable of generating a plurality of raw point scan measurement signals over a select arc; a computing device for receiving the raw point scan measurement signals and applying at least one algorithm to said plurality of raw point scan measurements to modulate said scan measurements signals and provide a first data set representing a flattened two-dimensional linear representation of travel distance of the low speed transport vehicle, saving said first data set in a memory queue, comparing said first data set with a plurality of previously saved datasets in said memory queue using a root mean square deviation algorithm, determining if said first data set exceeds a preselected deviation threshold, accepting said first dataset when said predetermined deviation threshold is not exceeded, calculating the distance traveled by said vehicle from said first data set and computing the speed of the vehicle to produce a unique speed profile representative of the transport vehicle.

Other objects are satisfied by a system for instantaneously and in real time determining the velocity of a rail car traveling linearly and proximate to a bulk material processing station, comprising: a radial scanning laser detector positioned perpendicularly to the line of travel of and for continuously scanning the rail car through a select arc corresponding to the sensor window of the laser detector; and a computing means for receiving detected laser signals from the detector in the window, storing the signals, trigonometrically flattening the signals to produce signal dataset corresponding to a linear representation of distance, filtering noise from the signal dataset, comparing the signal dataset with previously obtained signal datasets, selecting matched datasets with minimum sum errors, determining the direction of movement and calculating the real-time velocity of the target railcar by dividing the calculated distance traveled by the elapsed time between the matched datasets.

Still other objects are satisfied by a method for precisely determining the speed instantaneously and in real time of a bulk carrier transport vehicle proximate to a bulk material processing station during linear travel, comprising the steps of: positioning a radial scanning laser and detector perpendicular to the direction of linear travel of the vehicle; scanning the vehicle while in a detection window with the laser through a select arc; detecting returned signals from the laser and timestamps thereof to obtain a plurality of data points; feeding the plurality of data points to a computing device; applying a trigonometric algorithm to flatten the plurality of data points into a first dataset corresponding to a two-dimensional representation of speed; saving the first dataset into a memory queue in said computing device; comparing the first dataset with a previously obtained dataset and applying a root mean square deviation algorithm to determine if said first dataset falls within a maximum deviation threshold to qualify for further processing; calculating the X axis translation of a qualifying dataset corresponding to the travel distance of the vehicle; computing the time difference between a qualifying dataset and previously qualified datasets; and computing the vehicle speed by dividing the X-axis translation by the elapsed time of between the qualified datasets.

In simplest terms, this invention utilizes a radial scanning type laser-based speed measurement system and mathematical algorithms to track objects including particular deformations on the side of a bulk material transport vehicle, e.g., rail car, as it travels proximate to a bulk material processing station and within a sensing window of a laterally disposed laser/receiving sensor unit and measure distance traveled and the elapsed time between scans. By use of a continual scanning function provided by the laser sensor, a unique instantaneous, real-time speed profile of the transport vehicle as it passes through the measurement window is obtained.

This invention specifically provides an improvement over other prior technologies in that precise speed determinations at the point of measurement can be attained even at extremely low, sub-Doppler effect speeds.

As used herein "bulk material processing station" is intended to embrace a variety of equipment associated with bulk material transport including but not limited to particulate, comminuted solid, and flowable fluid loading/unloading systems, unloading systems, special purpose fluid applicator systems such as anti-clogging coatings freeze-proofing sprays, dust mitigating latexes, etc.

As used herein "connected" includes physical engagement, whether direct or indirect, permanently affixed or adjustably mounted. Thus, unless specified, "connected" is intended to embrace any operationally functional connection.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawing, and which is shown by way of illustration to a specific embodiment in which the invention may be practiced. The following illustrated embodiment is described in sufficient detail to enable those skilled in the art to practice the invention. It is to be understood that other embodiments may be utilized and that changes structural or methodological, based on presently known structural and/or functional equivalents may be made without departing from the scope of the invention.

DETAILED DESCRIPTION

Figure 1:
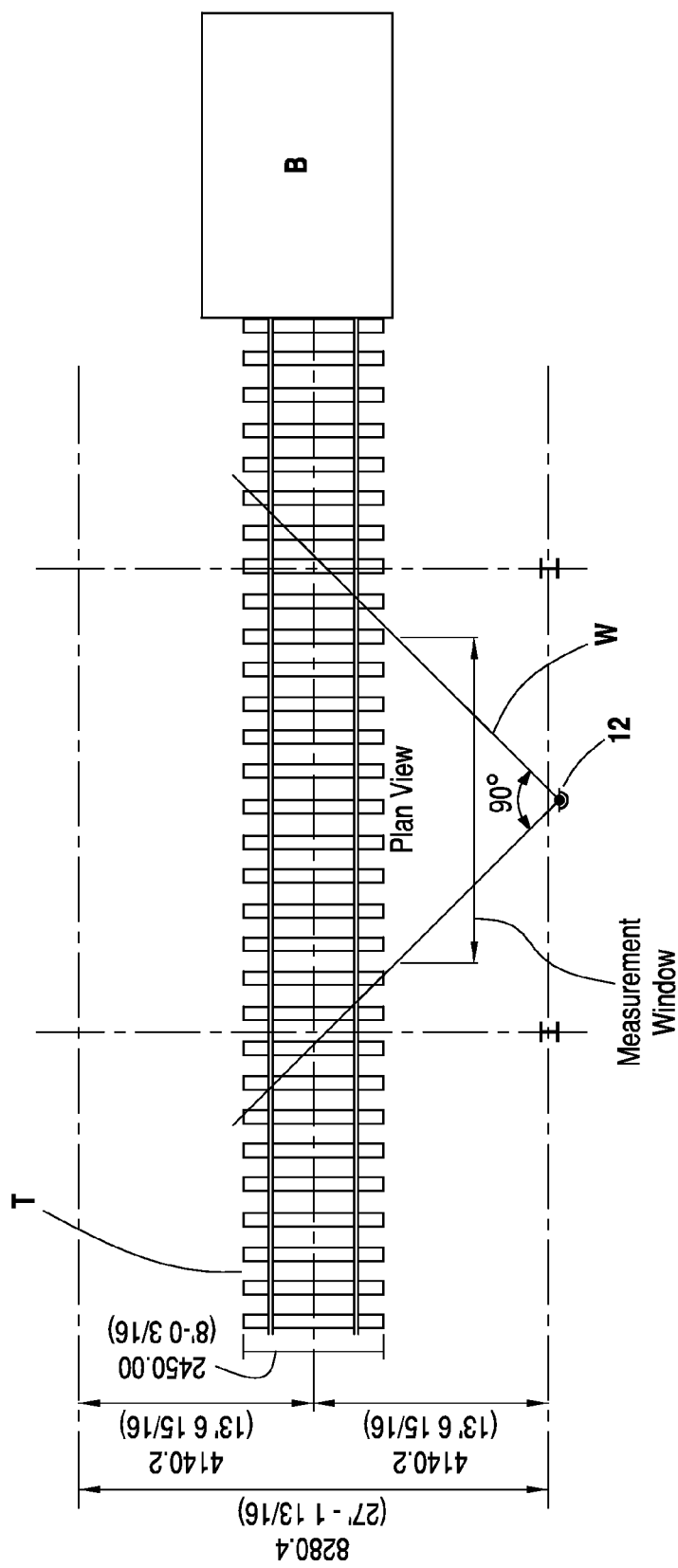
FIG. 1 is a representation of the physical positioning of laser scanning detection equipment in relation to railroad track equipment according to the invention.

FIG. 1 depicts a plan view of the positioning of a scanning laser detector 12 of the invention relative to a railroad track T proximate to a bulk material processing station B. Preferably, the scanning laser detector 12 is fixed to be perpendicular to the track and between 10 to 20 feet (3-6 meters) from the track midline. More preferably to provide a measurement window W with a 90° arc, the scanning laser detector 12 is located 13.5 feet (~4 meters) from the track mid-line.

Figure 2:
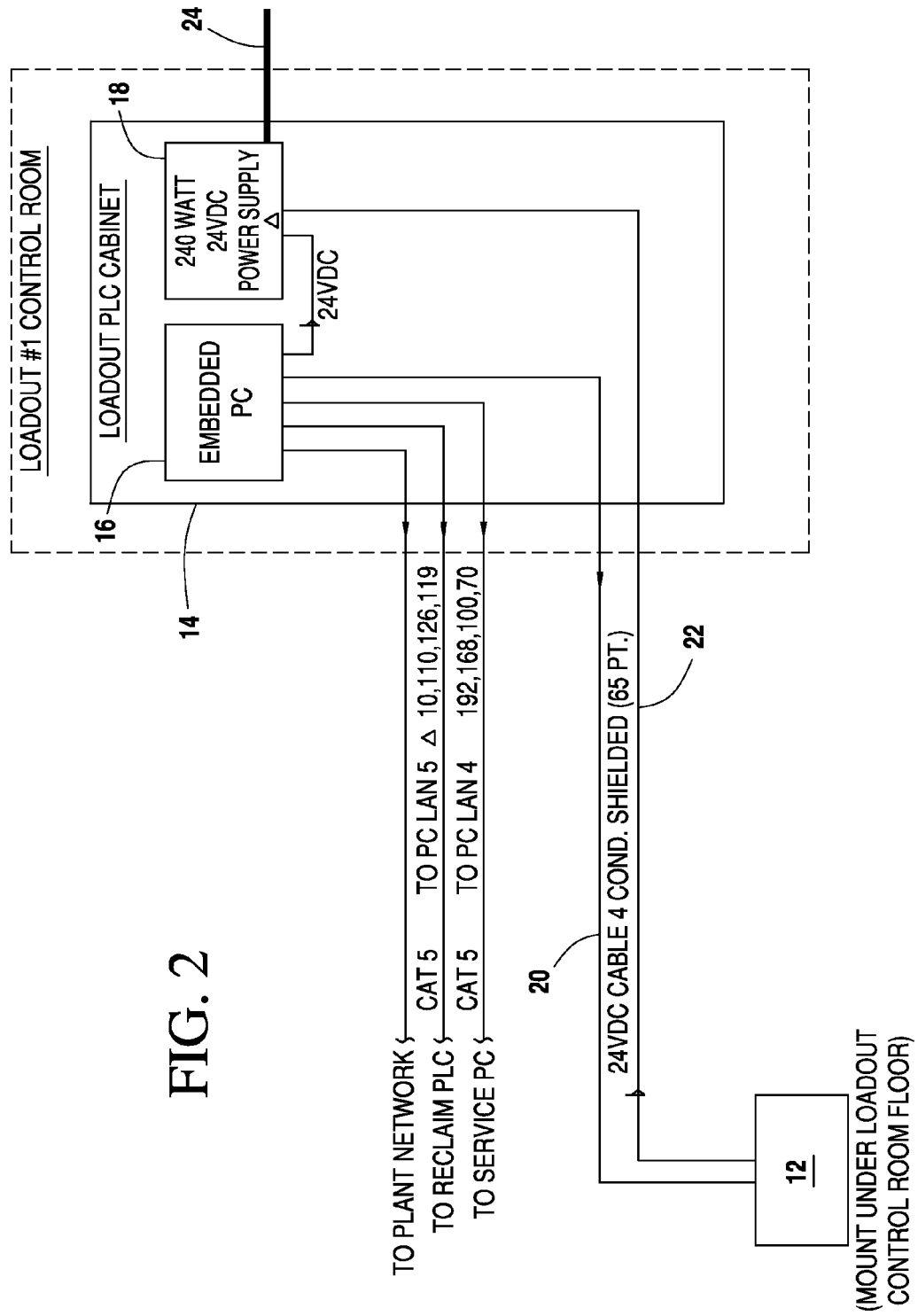
FIG. 2 is a schematic representation of a system according to an embodiment of the invention.

FIG. 2 illustrates a combination of components, all of which are commercially available, utilized for a typical installation. The scanner laser sensor unit 12 is of the type such as that available from SICK AG Waldkirch (Germany) as a Model LMS511 relying on time-of-flight technology for non-contact measurement. The scanner laser sensor unit 12 includes a heater and other sensitive electrical components and is contained in a sealed housing suitable for outdoor environments. Preferably the laser/receiving sensor unit 12 includes additional electrical functionalities to assist with proper alignment and calibration and may even include a separate communications up-link module for signal transmission to, for example, a remote monitoring station.

Figure 6:
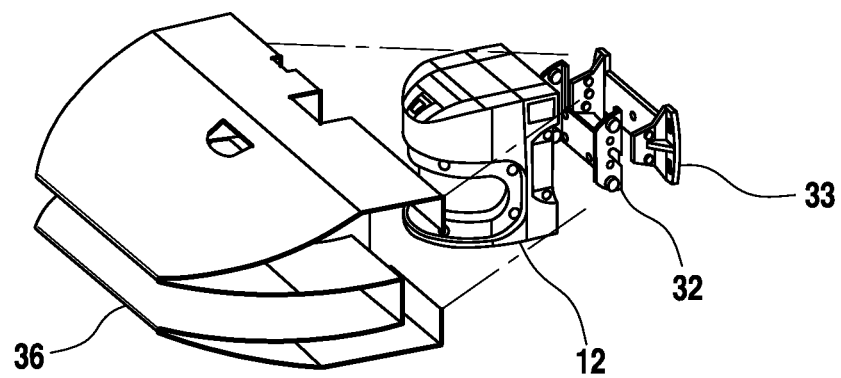
FIG. 6 is a perspective assembly view of an embodiment of a weather shielded tri-axis pole-mounted laser scanner according to an embodiment of the invention.
Figure 7:
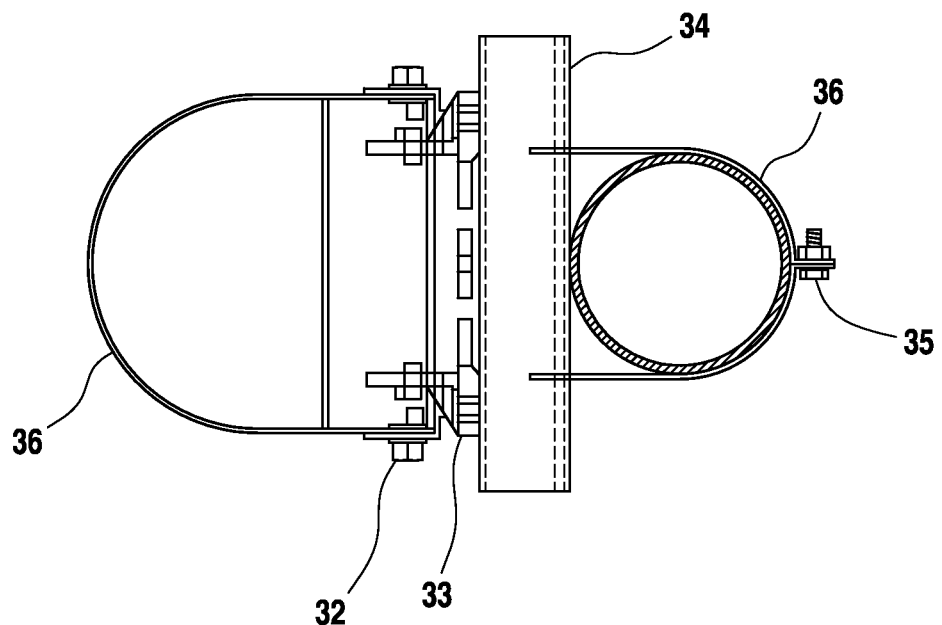
FIG. 7 is a top view of the mounted embodiment of FIG. 6.

The housed unit is strategically located near a bulk material processing facility loading or unloading facility (or other application where precise vehicle speed determination may be beneficial) and disposed substantially perpendicular to the direction of travel of unit train rail cars (essentially perpendicular to the rail track). Preferably the unit 12 is mounted with a protective environmental shield using a weather shield on a "tri-axis" adjustable pole type assembly such as that depicted in FIGS. 6 and 7. The unit 12 is attached to a bracket 32 which in turn is affixed to bracket 33 allowing for vertical angular adjustment. Bracket 33 is then attached to unistrut 34 which is attached to the pole 36) by the use of a pair of vertically spaced clamps 35. The combination of brackets 32 and 33 provide an adjustment for the y-axis (up/down) while the clamps 35 provide adjustment in the x-axis. In this manner the height and angle of the unit 12 can be rotationally adjusted to provide proper and accurate alignment and leveling relative to the target vehicle. Furthermore, the use of clamps 35 provide for precise vertical adjustment of unit 12 to a height sufficient to avoid interference from human foot traffic and other ground-level obstructions during scanning. The scanner unit 12 is mounted with a protective cover 36 that shields against potential damage from adverse ambient weather conditions.

Referring again to FIG. 2, the scanner laser sensor unit 12 is electrically connected by appropriate shielded cabling to an environmentally secure controller housing 14 containing an embedded computing device 16 such as that available from Advantech as a model UNO-2184G and a power supply 18 such as that available from MeanWell of New Taipei City, Taiwan as a model SDR-240. The computing device 16 includes microprocessors along with an array of communication ports, a LAN, serial ports, USB port, status indicators, and other features such as shock vibration and humidity resistance conventionally found in on-site industrial automation computers.

The controller housing 14 also contains a power supply 18. The power supply 18 preferably is rugged, lightweight and rated for 240 W to distribute sufficient electrical power to the computing device 16 and the scanning laser detector 12 unit (as well as ancillary, integrated heaters, communication equipment, etc. contained within the controller housing and/or the scanning laser detector 12 unit).

As illustrated in the present embodiment, communications between the scanning laser detector 12 unit and the embedded computing device 16 is accomplished over a shielded cable 20 while electrical power provided from the power supply 18 over a separate cable 22. The power supply 18 is connected to a conventional 120V AC line 24 that passes out of the control cabinet 14 through an appropriate feedthrough and to a conventional power outlet.

Although depicted in FIG. 2 as being spaced apart, the scanning laser detector unit 12 and controller housing 14 may be positioned in an over/under "stacked relationship" or the scanning laser detector unit 12 is located under an associated bulk processing station control room floor and the control cabinet 14 located proximate to that control room.

Figure 3:
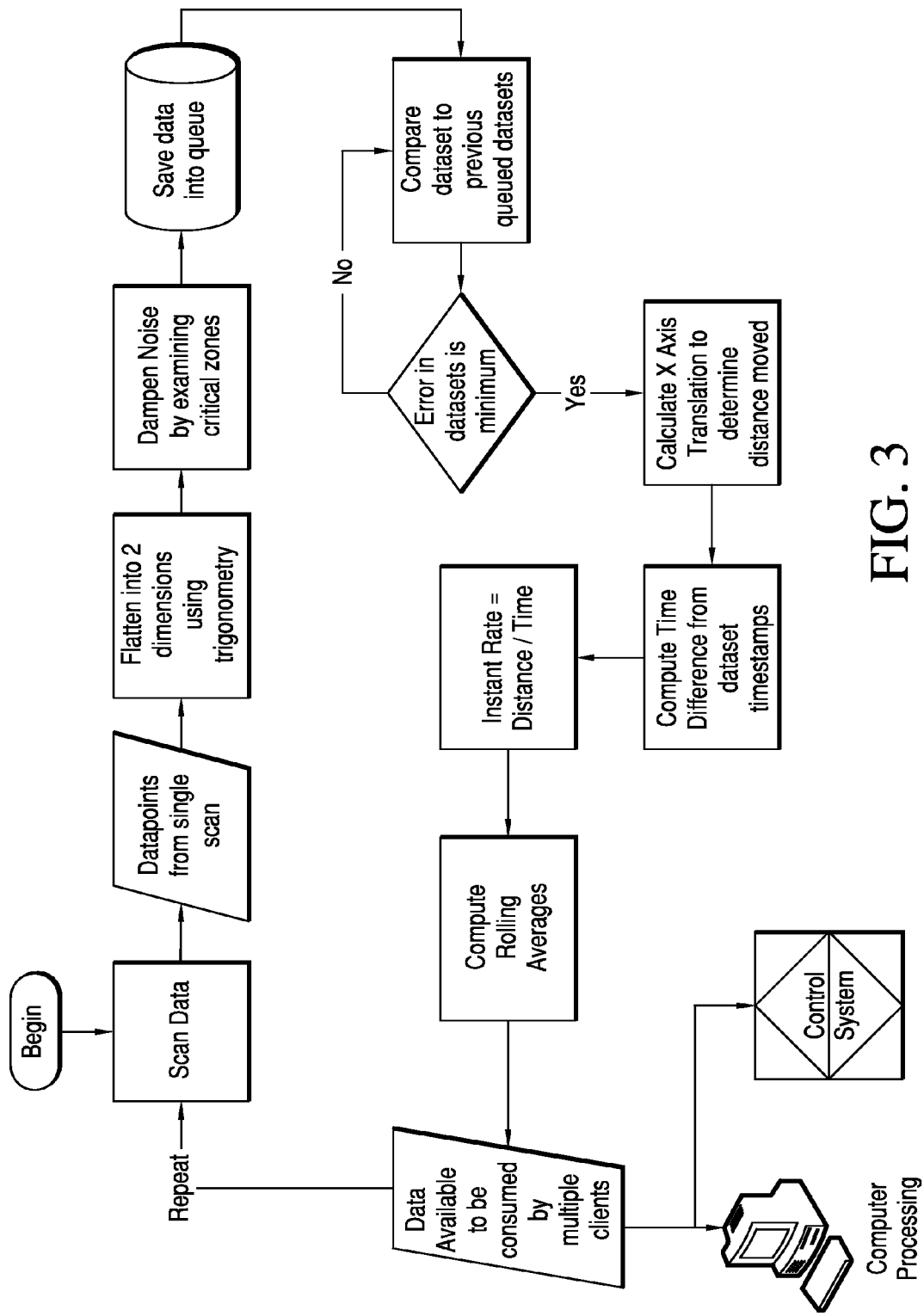
FIG. 3 is a representative flow chart of data processing of the scanned laser data points obtained from the equipment illustrated in the embodiment of FIG. 2.

FIG. 3 represents a flow chart of processing and methods in accordance with the described embodiment of the present invention. As a target object moves in a straight line perpendicular/orthogonal to the scanning device it is continuously scanned. The continuous scan rate of the laser detector unit 12 is preferably about fifty cycles per second (50 Hz) through a 90° arc. Although higher and lower scan rates may be employed, e.g., ≤10 Hz and ≥100 Hz, and obtuse arc angles greater than 90°, very high cycle rates and increasingly large triangulation variation occasioned by a wider scan arc entail increased computational requirements without a concomitant benefit in speed measurement accuracy or precision. In the context of very low cycle rates, the invention suffers from the periodic measurement problem of the prior art. In the case of significantly increased volume of raw received/returned signals from excessively high cycle rates or from excessively obtuse scan angles necessarily subject to trigonometric adjustment and unnecessarily excessive computational requirements with diminishing benefit.

During a single scan of the laser measurement device, numerous measurements are taken using time of flight technology to determine the distance from the laser measurement device to the passing unit train equipment. Each data point is processed by an integrated computer comprising part of the central processing unit system to give an exact distance measurement and an angle measurement for the data point. The combined data points from a single scan of the laser equipment are then compiled into a two dimensional representation of the equipment by utilizing trigonometric functions to flatten the recorded data points into real space two dimensional coordinates.

In the process of continuously scanning the side of a typical hopper style railcar, for example, the signals obtained during the 90° sweep reflects from the railcar side surface. Unique signals are also generated by specific surface discontinuities such as ribs, ladders/handlebars, couplers, wheel trucks, etc. Returned pulses from the sweep of the arc are detected by the sensor so that as the railcar moves linearly, each scan of the railcar topography generates a unique set of data points.

Figure 4:
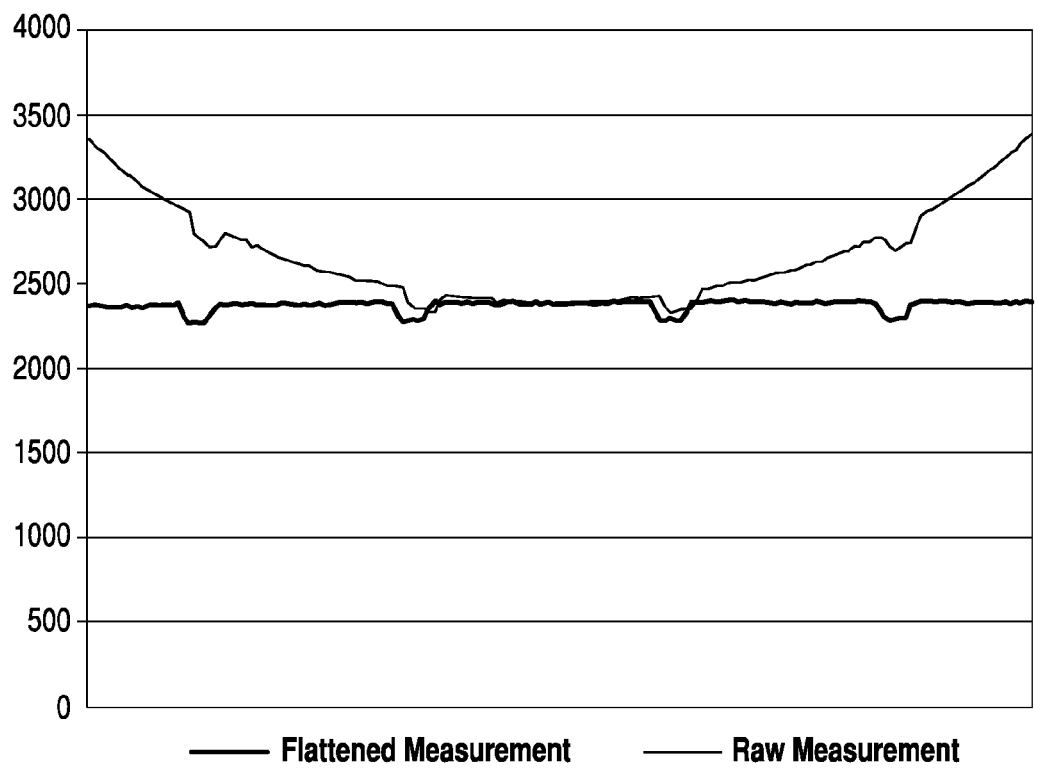
FIG. 4 is an illustrative graphical diagram of both a raw representation and a 'flattened' linear representation of measured distance obtained from the embodiment of the invention of FIG. 2.

Because the distance from the target through the scan window varies with increasing distance at the sweep boundaries, to normalize the graphical speed information, the detection curve is flattened in accordance with basic trigonometric principals into a 2-dimensional linear form where the X-axis differential corresponds to the distance traveled/linear movement of the vehicle. The trigonometric flattening is best illustrated in FIG. 4. Maximum flattening of the curve resulting from the received data corresponds to the furthest deviation from perpendicular, i.e., at 45 degrees. In simplest conceptual terms, the flattening converts the hypotenuse of the triangle formed between the stationary laser source/detector and the specific point on the vehicle subject to that particular scan into a leg which corresponds to that obtained from the scan normal to the target.

Following the flattening, a noise dampening algorithm is applied to minimize the effects of minor variances. Such variances in distance measured between the laser scanner and the target object may result from vibration or other minor movements. Therefore, it is preferred to remove these variations from the data set by identifying and filtering key areas of the target vehicle. For each key targeted area (i), a tolerance zone is defined ($Z_i$) with a value of $\Delta Z$. For each data point in the Y dimension, a comparison is made. If $|Y_i - Z_i| < \Delta Z$ then $Y_i = Z_i$.

The flattened and filtered dataset corresponding to the scan is then saved up to a memory queue. Once a series of scans has been stored, algorithms are employed to determine the best match of the stored scans so that a determination of movement through the measurement window can be calculated. In effect, the dataset, contingent on the speed of the railcar, is then compared to for deviations from previous datasets stored in the queue and subject to root mean square deviation analysis.

Beginning with the most recent dataset, the current dataset is shifted along the X axis back in time to compare to previous scans. The set of ordered pairs are compared and the sum is computed. This is done in a variety of know ways which may include, for example, the sum of the absolute differences of error on each data point or root mean square error calculations. These errors are observed and the two datasets with the minimum sum error are used for measurement purposes. The sum of absolute differences is described as follows:

$$\text{Error} = \Sigma_{i=1}^{n} |A - B_i| \text{ and}$$

the sum of root mean square error is described as follows:

$$\text{Error} = \sqrt{\sum_{i=1}^{n} (A - B_i)^2}$$

where n=number of data points in the dataset, A=current scan and B=previous scan.

For the purpose of illustration and not limitation, when the CPU finds only minimum error (generally obtained at very low speeds), the comparison may be reduced to five to ten of the previous datasets. However, the greater the error (mismatching) between the compared measurement datasets, generally resulting from higher vehicle speeds, the more datasets (up to 200) are required to be subject to evaluated to identify matching data sets. When compared with previous datasets in memory and the measured deviation/error is less than a prescribed minimum, e.g., ≤0.1%, the scan is deemed adequate and usable to compute the vehicle speed.

Figure 5:
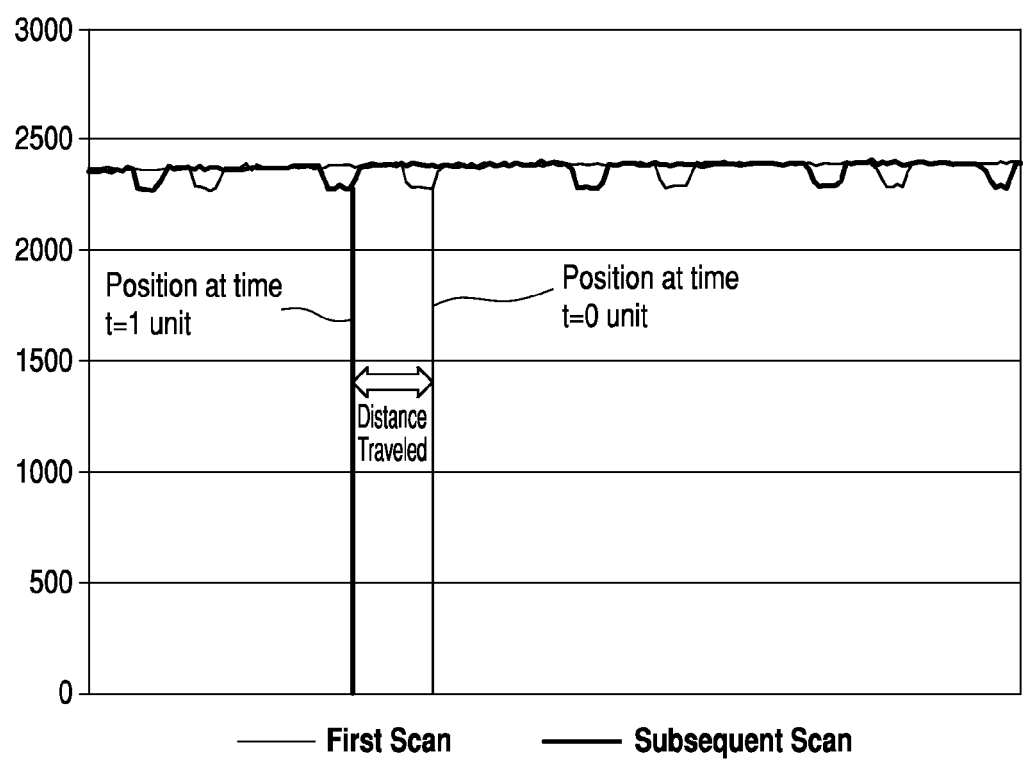
FIG. 5 is a representation of results of compared laser scan representations, along with their respective time capture, in order to calculate a distance traveled per unit of time (speed).

FIG. 5 illustrates a representation of two distinct sets of measurements that match but are offset by a distance that can be calculated by the offset degrees provided by the laser scanning measurement device. Because a precise timestamp is associated in unit 16 along with each individual set of distance measurements, the current speed of the unit train is calculated by dividing the distance traveled by the time elapsed between the two matched data sets. In the case of matched scans, additional algorithmic computations are made to determine the direction of the movement along with the distance traveled between the two matched scans. For example, an algorithm is defined as $$\Delta x = \frac{\sum_{j=1}^{n} \Delta x_j}{n} \text{ where } \Delta x_j = \text{Min}\left(\left|\frac{A_i - A_{i+1}}{B_i - B_{i-1}} - K\right|\right)$$

with K being a configurable constant, can be used for this purpose.

The speed results for each target vehicle is then recorded in memory and may be subject to further processing such generating multiple rolling averages for an entire train or the like. Acceptable speed calculation and time on station information can be relayed electronically (through cabling or wirelessly) to the associated bulk material processing system controller. Such information can also be made available immediately to a related control system through an electronic uplink for remote access and monitoring.

As the laser scanner equipment is continuously scanning and providing new data sets for determination, the process of finding substantially the best matches for two sets of distance measurement data is repeated continuously as long as the vehicle that is being measured is present in the measurement window of the laser scanner device. This method produces a real time measurement of the current vehicle speed that can then be utilized by associated bulk material process control equipment.

Although the present invention has been described in terms of a particular example embodiment, it is not limited to that embodiment. For example, although the embodiment is described in the context of a railcar, the invention is readily adaptable to use with any granulated material transport vehicle, e.g., barges, semis, truck trains, etc. The embodiments, examples, and modifications which would still be encompassed by the invention may be made by those skilled in the art, particularly in light of the foregoing teachings. Moreover, although specific terms are employed herein, they are used only in generic and descriptive sense, and not for the purposes of limiting the description of the invention.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. A system for instantaneous, real-time speed measurement of a select low speed transport vehicle moving in a linear direction of travel and proximate to a bulk material processing station, comprising:
a stationary scanning laser and detecting sensor positioned to one side of and generally perpendicular to the direction of travel, said stationary scanning laser and detecting sensor capable of generating a plurality of raw point scan measurement signals over a select arc;
a computing device for receiving the plurality of raw point scan measurement signals and applying at least one algorithm to said plurality of raw point scan measurement signals to modulate said plurality of raw point scan measurement signals and provide a first data set representing a flattened two-dimensional linear representation of travel distance of the low speed transport vehicle, saving said first data set in a memory queue, comparing said first data set with a plurality of previously saved datasets in said memory queue using a root mean square deviation algorithm, determining if said first data set exceeds a preselected deviation threshold, accepting said first data set when said preselected deviation threshold is not exceeded, calculating the distance traveled by a transport vehicle from said first data set and computing the speed of said transport vehicle to produce a unique speed profile representative of the transport vehicle.

2. The system according to claim 1 where the stationary scanning laser and detecting sensor continuously detects the target vehicle travel through a select arc.

3. The system according to claim 1 where the stationary scanning laser has a radial scan arc of 90° and said detecting sensor provides continuous detection.

4. The system according to claim 3 where the scanning cycle rate is 50 Hz.

5. The system according to claim 2 where the computing device filters noise generated by vehicle vibration from the flattened two-dimensional linear representation prior to storing in the memory queue.

6. The system according to claim 2 where the computing device calculates a rolling average of said transport vehicle based on a plurality of sequential speed profile computations.

7. The system according to claim 1 further comprising a tri-axis adjuster for alignment and leveling of the detecting sensor with the stationary scanning laser.

8. The system according to claim 7 where said stationary scanning laser and detecting sensor are situated in a protective enclosure and disposed at a height selected to avoid ground level obstruction interference.

9. The system of claim 5 where for speed differences resulting from differential spacing occasioned by stretching between a plurality of railcars in a train is computed.

10. A system for instantaneously and in real time determining the velocity of a rail car traveling linearly and proximate to a bulk material processing station, comprising:
a radial scanning laser detector positioned perpendicularly to the line of travel of and for continuously scanning the rail car through a select arc corresponding to a sensor window of the radial scanning laser detector; and
a computing means for receiving detected laser signals from the radial scanning laser detector in the sensor window, storing the detected laser signals, trigonometrically flattening the detected laser signals to produce a signal dataset corresponding to a linear representation of distance, filtering noise from the signal dataset, comparing the signal dataset with previously obtained signal datasets, selecting matched datasets with minimum sum errors, determining the direction of movement and calculating the real-time velocity of a target railcar by dividing the calculated distance traveled by the elapsed time between the matched datasets.

11. The system of claim 10 further comprising an alignment controller for the radial scanning laser detector connected to a computing device to maintain alignment.

12. The system of claim 10 where the radial scanning laser detector is housed in a protective enclosure and is height adjustable.

13. The system of claim 10 where the computing means is connected to a communications up-link for electronically relaying the obtained speed information.

14. The system of claim 10 where the radial scanning laser detector is sealed in a heated, environmentally sealed housing electrically connected to a power source, and mounted on a tri-axis adjustable mounting providing precise alignment and leveling relative to the target railcar.

15. A method for precisely determining the speed instantaneously and in real time of a bulk carrier transport vehicle proximate to a bulk material processing station during linear travel, comprising the steps of:
a) positioning a radial scanning laser and detector perpendicular to the direction of linear travel of a vehicle;
b) scanning the vehicle while in a detection window with a laser through a select arc;
c) detecting returned signals from the laser and time-stamps thereof to obtain a plurality of data points;
d) feeding the plurality of data points to a computing device;
e) applying a trigonometric algorithm to flatten the plurality of data points into a first dataset corresponding to a two-dimensional representation of speed;
f) saving the first dataset into a memory queue in said computing device;
g) comparing the first dataset with a previously obtained dataset and applying a root mean square deviation algorithm to determine if said first dataset falls within a maximum deviation threshold to qualify for further processing;
h) calculating the X axis translation of a qualifying dataset corresponding to the travel distance of the vehicle;
i) computing the time difference between a qualifying dataset and previously qualified datasets; and
j) computing the vehicle speed by dividing the X-axis translation by the elapsed time of between the qualified datasets.

16. The method of claim 15 further where an algorithm based on root mean square deviation is used for dataset comparison.

17. The method of claim 15 further comprising the step of damping noise in the first flattened dataset.

18. The method of claim 17 further comprising the step of calculating rolling averages of the vehicle speed.

19. The method of claim 18 further comprising the step of providing the calculated rolling average to a controller for the bulk material processing system.

20. The method of claim 18 further comprising the step of providing the calculated rolling averages of the vehicle speed to a remote monitor system.

* * * * *